US008451165B2

(12) United States Patent
Puzella et al.

(10) Patent No.: US 8,451,165 B2
(45) Date of Patent: May 28, 2013

(54) MOBILE RADAR SYSTEM

(75) Inventors: Angelo M. Puzella, Marlborough, MA (US); Steven T. Cummings, Amherst, NH (US); Joseph A. Licciardello, The Villages, FL (US); Jerome H. Pozgay, Marblehead, MA (US); Stephen J. Pereira, Hopedale, MA (US); Michael G. Sarcione, Millbury, MA (US); Peter D. Morico, North Grafton, MA (US); James A. Roche, Jr., Franklin, MA (US)

(73) Assignee: Raytheon Company, Waltham, MA (US)

( * ) Notice: Subject to any disclaimer, the term of this patent is extended or adjusted under 35 U.S.C. 154(b) by 302 days.

(21) Appl. No.: 12/960,785

(22) Filed: Dec. 6, 2010

(65) Prior Publication Data

US 2012/0139786 A1  Jun. 7, 2012

(51) Int. Cl.
*G01S 7/42* (2006.01)
*G01S 13/00* (2006.01)
*H01Q 1/32* (2006.01)

(52) U.S. Cl.
USPC ............ 342/70; 342/13; 342/175; 343/711; 343/713

(58) Field of Classification Search
USPC ........... 342/13–20, 70–72, 175; 343/705–717
See application file for complete search history.

(56) References Cited

U.S. PATENT DOCUMENTS

| | | | |
|---|---|---|---|
| 3,656,164 A * | 4/1972 | Rempt | 343/705 |
| 4,043,687 A * | 8/1977 | Van Dyke et al. | 403/109.3 |
| 4,231,200 A | 11/1980 | Henderson | |
| 4,662,588 A * | 5/1987 | Henderson | 244/118.2 |
| 4,941,797 A * | 7/1990 | Smillie, III | 414/462 |
| 5,102,375 A | 4/1992 | Featherstone | |
| 5,168,679 A | 12/1992 | Featherstone | |
| 5,173,706 A * | 12/1992 | Urkowitz | 342/99 |

(Continued)

FOREIGN PATENT DOCUMENTS

| | | |
|---|---|---|
| DE | 20 29 605 A1 | 6/1972 |
| WO | WO 2009/058651 A1 | 5/2009 |

OTHER PUBLICATIONS

Invitation to Pay Additional Fees of the ISA for PCT/US2011/058511 dated Jul. 2, 2012.

(Continued)

*Primary Examiner* — Jack W Keith
*Assistant Examiner* — Peter Bythrow
(74) *Attorney, Agent, or Firm* — Daly, Crowley, Mofford & Durkee, LLP

(57) ABSTRACT

Described is a mobile radar system which provides both persistent surveillance and tracking of objects with adaptive measurement rates for both maneuvering and non-maneuvering objects. The mobile radar system includes a vehicle having mounted therein an active, electronically-steerable, phased array radar system movable between a stowed position and a deployed position and wherein the phased array radar system is operational in both the deployed and stored positions and also while the vehicle is either stationary or moving. Thus, the mobile radar system described herein provides for longer time on target and longer integration times, increased radar sensitivity and improved Doppler resolution and clutter rejection. This results in a highly mobile radar system appropriate for use in a battlefield environment and which supports single-integrated-air-picture metrics including but not limited to track purity, track completeness, and track continuity and thus improved radar performance in a battlefield.

30 Claims, 11 Drawing Sheets

U.S. PATENT DOCUMENTS

| | | | | |
|---|---|---|---|---|
| 5,179,382 | A * | 1/1993 | Decker | 342/8 |
| 5,264,863 | A * | 11/1993 | Miner et al. | 343/881 |
| 5,575,438 | A * | 11/1996 | McGonigle et al. | 244/13 |
| 5,611,177 | A | 3/1997 | Herbstritt | |
| 5,677,506 | A * | 10/1997 | Wallin | 89/38 |
| 5,786,854 | A | 7/1998 | Slade et al. | |
| 5,917,442 | A * | 6/1999 | Manoogian | 342/62 |
| 6,009,791 | A * | 1/2000 | Medlin | 89/38 |
| 6,028,566 | A * | 2/2000 | Pennell et al. | 343/878 |
| 6,104,910 | A | 8/2000 | Koths | |
| 6,174,124 | B1 * | 1/2001 | Haverfield et al. | 414/642 |
| 6,198,460 | B1 * | 3/2001 | Brankovic | 343/879 |
| 6,260,310 | B1 * | 7/2001 | Price et al. | 52/110 |
| 6,302,010 | B1 * | 10/2001 | Holler | 296/187.07 |
| RE37,559 | E | 2/2002 | Marue et al. | |
| 6,452,536 | B1 * | 9/2002 | Thomassen | 342/74 |
| 6,606,059 | B1 * | 8/2003 | Barabash | 343/700 MS |
| 6,717,543 | B2 * | 4/2004 | Pappert et al. | 342/13 |
| 6,733,227 | B2 * | 5/2004 | Fitzgerald et al. | 414/486 |
| 6,767,115 | B2 | 7/2004 | Blackwelder | |
| 7,000,357 | B1 | 2/2006 | Stearns et al. | |
| 7,013,790 | B2 * | 3/2006 | Helms et al. | 89/38 |
| 7,432,868 | B2 * | 10/2008 | Webb et al. | 343/766 |
| 7,508,338 | B2 * | 3/2009 | Pluymers et al. | 342/175 |
| 8,284,109 | B2 * | 10/2012 | Alberding et al. | 343/713 |
| 2001/0046258 | A1 * | 11/2001 | Wise et al. | 375/219 |
| 2003/0080907 | A1 * | 5/2003 | Wang et al. | 343/713 |
| 2003/0156932 | A1 * | 8/2003 | Fitzgerald et al. | 414/486 |
| 2004/0046688 | A1 * | 3/2004 | Bigge et al. | 342/52 |
| 2006/0055599 | A1 * | 3/2006 | McIntire et al. | 342/368 |
| 2006/0092075 | A1 * | 5/2006 | Bruce et al. | 342/175 |
| 2007/0001914 | A1 * | 1/2007 | Robnett et al. | 343/713 |
| 2007/0252748 | A1 * | 11/2007 | Rees et al. | 342/29 |
| 2008/0136718 | A1 * | 6/2008 | Tietjen | 343/711 |
| 2008/0204350 | A1 * | 8/2008 | Tam et al. | 343/872 |
| 2009/0135051 | A1 * | 5/2009 | Bishop et al. | 342/175 |
| 2010/0066617 | A1 * | 3/2010 | Alberding et al. | 343/713 |
| 2010/0066631 | A1 * | 3/2010 | Puzella et al. | 343/853 |

OTHER PUBLICATIONS

Engineering Services Memorandum; Subject: Lightweight Antenna Mast Group; U.S. Government Contract No. DAAH-01-00-C-0028; Submitted May 15, 2002 by Raytheon Electronic Systems.

Jane's Radar and Electronic Warefare Systems; "TRC-20;" Jane's Information Group, Apr. 27, 2009, 5 pages.

Klembowski, et al.; "PIT Achievement in Radar and Elint Technology;" IEEE Xplore, Downloaded on Jun. 3, 2009; 9 pages.

Klembowski, et al.; "Trends in Radar Technology and PIT Achievements;" IEEE Xplore, Downloaded on Jun. 3, 2009; pp. 77-85.

"Light Antenna Mast Group (LAMG);" Raytheon Integrated Defense Systems; Brochure, AUSA Show, Oct. 2002.

Weedon, et al.; "T/R Module Design and Calibration;" Presented at 2010 IEEE International Symposium on Phased Array Systems and Technology; Oct. 12-15, 2010; 4 pages.

"WIBE HMMWV based Antenna Mast System;" Raytheon Electronic Systems; Photographs of AB WIBE System; Slides 20 and 21; AB WIBE; Sweden, Apr. 2000.

International Search Report of the ISA for PCT/US2011/058511 dated Oct. 17, 2012.

Written Opinion of the ISA for PCT/2011/058511 dated Oct. 17, 2012.

* cited by examiner

MOBILE RADAR SYSTEM

FIELD OF THE INVENTION

The system and techniques described herein relate generally to radar systems and more particularly to mobile radar systems.

BACKGROUND OF THE INVENTION

As is known in the art, there is a great need for highly mobile, medium-range, tactical radar systems that provide information about enemy artillery, mortar and rocket launcher locations for counterattack and other significant threats to warfighters on the ground. Such a radar system must provide high operational availability and reduced maintenance costs.

Conventional radar systems which attempt to serve this function are stowed and typically transported (e.g. towed) by so-called "high mobility multi-purpose wheeled vehicles" or HMMWV's or any other vehicle suitable for the transport task. Such mobile radar platforms are typically located proximate forward battle lines in direct support of brigade operations. Typically, the radar system must be capable of being set up and operational in approximately fifteen (15) minutes. Since such radars are in a fixed position when they are operating (i.e. they can only be operational when they are stationary), they eventually become a target for enemy attack. Thus, the radars must also be capable of moving from an existing location within five (5) minutes of a decision being made to evacuate a given position. This involves stopping radar operation and securing the radar in a stored position (e.g. on an HMMWV or a trailer attached to an HMMWV) for transport to a new position.

Some tactical land based radars employ rotating antennas on stationary platforms during operation. There are a number of shortcomings to this mode of operation. First, the fixed radar position, located close to the forward battle line in direct support of brigade operations, becomes a possible enemy target. Second, forces which are on the move may not receive the benefits provided by a stationary radar and thus may be unprotected from enemy artillery, mortars and rockets. Third, a rotating antenna places limits on radar system performance (e.g. limits search time, reduces track signal-to-noise ratio, etc. . . . ). Fourth, a rotating antenna system severely complicates signal routing to the antenna, degrades system reliability and availability and burdens life-cycle cost.

SUMMARY OF THE INVENTION

In accordance with the concepts, techniques and systems described herein, a mobile radar system (also sometimes referred to herein as an "on-the-move" radar system) includes a phased array radar system configured to be mounted in a vehicle. The phased array radar system is movable between a stowed position and a deployed position; while on the vehicle the operation is in either the stowed or deployed position, and also while the vehicle is stationary or moving.

With this particular arrangement, a highly mobile battlefield radar system suitable for use in a battlefield or other environment is provided. Since the phased array radar system is operational when it is in either a stowed position or a deployed position and also while the vehicle to which the phased array radar is mounted is stationary or moving, the mobile radar system can operate while travelling to, from and/or around a battlefield environment (i.e. the mobile radar is operational regardless of whether the vehicle is moving or stopped). Thus, the mobile radar system can avoid and evade enemy attacks while still operating and thus while supporting troops in a battlefield.

In one embodiment, with the phased array radar system operational while in its stowed position, the vehicle can move at a top speed which is greater than a top speed of the vehicle when the phased array radar system is in its deployed position. In one embodiment, when the antenna platform is in its deployed position, the phased array radar system provides substantially 360 degrees of scan coverage (regardless of whether the vehicle is moving or stopped). In one embodiment, when the phased array radar system is in its stowed position, it provides substantially 270 degrees of scan coverage (regardless of whether the vehicle is moving or stopped). Since the phased array radar system provides substantially 270 or 360 degrees of coverage, the phased array radar system is able to track targets in a wide range of areas. In cases in which the phased array radar system includes an electronically-steerable phased array (AESA) antenna having substantially 270 or 360 degrees of coverage, search raster rates are not limited as in radar systems which utilize a mechanically rotating antenna to provide such coverage. Also, in the case where an AESA antenna is used, the mobile radar system described herein is adaptable to a current threat limited only by the speed at which beams can be switched.

Since the mobile radar system provides 270° or 360° of scan coverage and can remain operational even while moving from one physical location to another, the mobile radar system provides for longer time-on-target, longer integration times, increased radar sensitivity and improved Doppler resolution and clutter rejection than prior art systems.

The mobile radar system can provide, while stationary or in motion, persistent surveillance and tracking of objects with adaptive measurement rates for both maneuvering and non-maneuvering objects. In one embodiment, the phased array radar system comprises an active electronically-steerable, phased array (AESA) antenna mounted on an antenna platform movable between a stored position and a deployed position. Significantly, the AESA antenna is operational in both the deployed and stored positions of the movable antenna platform.

Providing a mobile radar system which is operational while both stationary and moving results in a mobile radar system which supports the achievement of completely compliant single-integrated-air-picture (SIAP) metrics such as track purity, track completeness, track continuity.

In one embodiment, the AESA antenna is provided as a solid state active array having a plurality of "array faces" (or more simply, "faces") which provide 360 degrees of scan coverage. In one embodiment, the AESA antenna has four faces. The four faces are arranged such that the AESA antenna provides continuous 360 degrees of coverage.

In one embodiment, the mobile radar system (aka the on-the-move radar system) may further include a generator coupled to an AESA antenna. The generator provides an amount of power to the AESA antenna which is sufficient to power the antenna. In one embodiment, the AESA antenna uses prime power provided by a vehicle on which the AESA antenna is mounted. In one embodiment, the AESA antenna comprises a plurality of faces and the primary power is shared among all the faces. Thus, the AESA antenna is provided as a self-contained antenna. In one embodiment, the AESA antenna is provided as a self-contained, four face, solid state AESA antenna.

In one embodiment, the vehicle and phased array radar system which make up the mobile radar system do not require any set-up time to operate. That is, the phased array radar system is continuously operational regardless of vehicle motion or whether the phased array radar system is in a deployed position, a stowed position or some other position (e.g. neither fully deployed, nor fully stowed). Thus, the system has the flexibility needed to adapt to situational battlefield developments.

For example, the mobile radar system can move to avoid or evade possible enemy attack while still remaining operational and providing information (e.g. target locations and tracks) to third parties. Also, since the AESA antenna provides substantially simultaneous 360 degrees of coverage, faster search rates are not limited as in radar systems which utilize phased array radars which mechanically rotate to provide 360 degrees of coverage. Furthermore, the ability to remain operational even while moving allows the mobile radar system to detect and track targets at all times during battlefield operations. Thus, the mobile radar system helps achieve completely compliant single-integrated-air-picture (SIAP) metrics including but not limited to total purity, track completeness, and track continuity.

In one embodiment, the phased array radar system is provided having four faces. Each face of the phased array radar system may be provided as an AESA antenna and the phased array radar is configured such that it is possible to electronically switch between the faces in any sequence. Electronic scan by four AESA faces vastly enhances search update rates and allows greater flexibility in scheduling radar waveforms compared with mechanically rotating system. For example, since each AESA can be treated as a separate radar, each AESA face can be autonomously operated (i.e., one face can operate in a search mode at one instant, and a second different face can operate in a track mode at the next instant). This allows different sectors to be scanned according to threat. Thus, the mobile radar system provides substantially continuous 360 degree coverage capability even while tracking a threat in a given sector. It should be appreciated that a full operational face can only be performed in one instant of time with the limitation of an on-board generator. Without any such limitations, it would be possible to have one face operate in a search mode at one instant in time, and a second different face operate in a track mode at the same instant in time.

Also, since each AESA antenna can be treated as a separate radar, the mobile radar system can simultaneously operate multiple sub-apertures on different faces of the phased array radar system to detect and track targets.

This is in stark contrast to the operation of a rotating radar since once a rotating radar stops and focuses resources on a given sector, the radar is now completely blind to threats that may arise in other (now ignored) sectors.

Also, since the radar described herein is a continuously operational system and provides substantially continuous 360 degree coverage while moving or stopped, it can track highly maneuvering, low radar cross-section (RCS) targets at rates which are orders-of-magnitude faster than that achievable in mechanically rotating radars. This capability enables high levels of track consistency, continuity, and clarity that can significantly contribute to the formation of a single-integrated-air-picture (SIAP) in complex, multiple threat, multiple-friendly environments.

Furthermore, since the mobile radar system provides substantially continuous 360 degree coverage while moving or stopped (e.g. when the vehicle on which the phased array radar system is mounted is moving or parked), the mobile radar system need not stay in one location at all times. Since the mobile radar system need not stay in one location to be operational, the risk of the mobile radar system itself becoming a target is reduced.

This is in contrast to prior art battlefield radar systems which operate at a fixed location for an amount of time which allows an enemy to identify the location of a battlefield radar and thus make the radar location a target.

Since the mobile radar system utilizes an active, electronically steerable array (AESA) antenna having a size and shape configured to provide substantially continuous 360 degree coverage, the mobile radar system need not utilize a rotating antenna aperture. Elimination of a rotating antenna aperture significantly simplifies all signal interfaces between the solid-state AESA and a radar signal processor, prime power and receiver/exciter sub-systems. This results in a system having reliability which is greater than the reliability of prior art systems.

In one exemplary embodiment, the mobile radar system comprises a solid state AESA having four faces with each of the faces having an area of approximately one square meter (1 $m^2$). In a preferred embodiment, each face of the mobile radar system is comprised of a panel array antenna disposed on a movable antenna platform. In this configuration, the mobile radar system provides almost instantaneous coverage in an approximately 360 degree range in a deployed mode and in an "on-the-move" mode (i.e. with movable antenna platform in a stowed position), the mobile radar system provides almost instantaneous coverage in an approximately 270 degree range. This is true regardless of varying terrain and climate conditions. Furthermore, each panel array antenna face is mounted to a frame which in turn is coupled to a telescoping platform or mast. Also, the panel array antennas are mounted in a manner which allows the panels to be removed and replaced without making or breaking power and signal cables.

Utilizing panel arrays significantly reduces cost, weight and size of a mobile radar system while also providing an exceptional power-aperture-gain (PAG) sensitivity. In one embodiment, a 128 transmit-receive (TR) channel panel array comprises a "building-block" for an active electronically scanned array (AESA) antenna. The panel array integrates RF, DC and logic distribution to 128 TR channels. In addition, the 128 TR channel panel array integrates a three-channel monopulse network (transmit/sum channel, delta elevation channel and delta azimuth channel).

In one embodiment, the panel array is conduction cooled by direct mechanical contact between backsides of flip-chip components and a brazement with a liquid pumped through the brazement.

In one embodiment, thermal management of the array is addressed via component and subassembly packaging. In particular, in addition to the liquid cooled brazement, direct mechanical contact between flip-chip monolithic microwave integrated circuits (MMICs) and a finned heat sink is used. An intermediate "gap pad" layer may or may not be used between the MMICS and the heat sink. Ideally, each MMIC has substantially the same thermal resistance to a cold plate which reduces (or in some case may even minimize) the number of thermal interfaces between the source of heat (e.g. the MMICs) and the cold plate or other heat sinking source. Thus, a parallel cooling approach is used.

In one embodiment, a centrally located heat exchanger provides the cooling for all four AESA faces.

In one embodiment, the system also includes an active monopulse combiner network assembly. This assembly, which is part of an overall monopulse network, enables use of a single panel array design (i.e. a single panel array design part number), eliminates quantization lobes (resulting from correlated weighting at the sub-array level) and produces low sidelobes. This approach preserves panel array scalability and affordability and produces excellent monopulse patterns and an exemplary network is described in co-pending application Ser. No. 12/757,371, filed Apr. 9, 2010 which is assigned to the assignee of the present invention and which is incorporated herein by reference in it's entirety.

In one embodiment, each panel comprises modular line replaceable units (LRUs). In one exemplary embodiment, a panel which is one (1) square meter ($m^2$) in area is comprised of four (4) weather-tight, electromagnetic interference (EMI) shielded LRU's. Each LRU comprises eight (8) sub-panels, a brazement to cool the sub-panels, four (4) active monopulse combiner network assemblies, four (4) power-logic circuit cards, one (1) distribution board, four (4) linear regulators (LR), eight (8) DC/DC converters, a brazement to cool the DC/DC converters and LR's, and a bus bar. In one particular embodiment, each LRU is approximately 46 in. (high)×10 in. (wide)×4 in. (deep) and the LRU weight is estimated to be 64 lbs. The LRU approach provides several advantages: (1) LRU's allow easy access to signal and coolant lines; (2) LRU's can be removed or inserted into the face of an AESA in a short amount of time; (3) LRU weight allows replacement to be accomplished manually (e.g. it is a two-man lift); and (4) the LRU approach reduces associated costs of packaging and cooling an array.

In one embodiment, the system utilizes centralized prime power. The prime power source may be provided as part of the vehicle or as part of the phased array radar system. In one exemplary embodiment, a central 208 VAC 3-phase generator provides system prime power and is converted to +30V DC that is used to bus power to each face of the AESA (where each face is on the order of 1 $m^2$). This approach eliminates relatively expensive +30V DC/DC converters utilized in prior art approaches.

Thus, described herein is a mobile radar system which, in one embodiment, is a self-contained, four face, solid state AESA radar disposed on a telescoping platform (or telescoping mast) mounted to a ground based vehicle (e.g. a HMMWV). The mobile radar system is coupled to the telescoping platform or mast in such a way that the AESA antenna is operational in at least two positions (e.g. AESA antenna fully raised and AESA antenna fully lowered). With this arrangement, a self-contained, four face, solid state phased array radar system on a telescoping platform or mast mounted to a ground based vehicle which is operational in at least two positions is provided. Since the phased array radar system is operational in at least two positions (e.g. AESA fully raised and AESA fully lowered), no set up time is required before operating the system. Furthermore, the mobile radar system operates in at least two different radar modes: 1) air surveillance and 2) small arms fire surveillance and tracking.

Although the mobile radar system is described primarily in the context of being mounted on a mobile vehicle (e.g. a HMMWV), it should be appreciated that the mobile radar system can be placed on a wide variety of other vehicles.

DETAILED DESCRIPTION OF THE PREFERRED EMBODIMENTS

Figure 1:
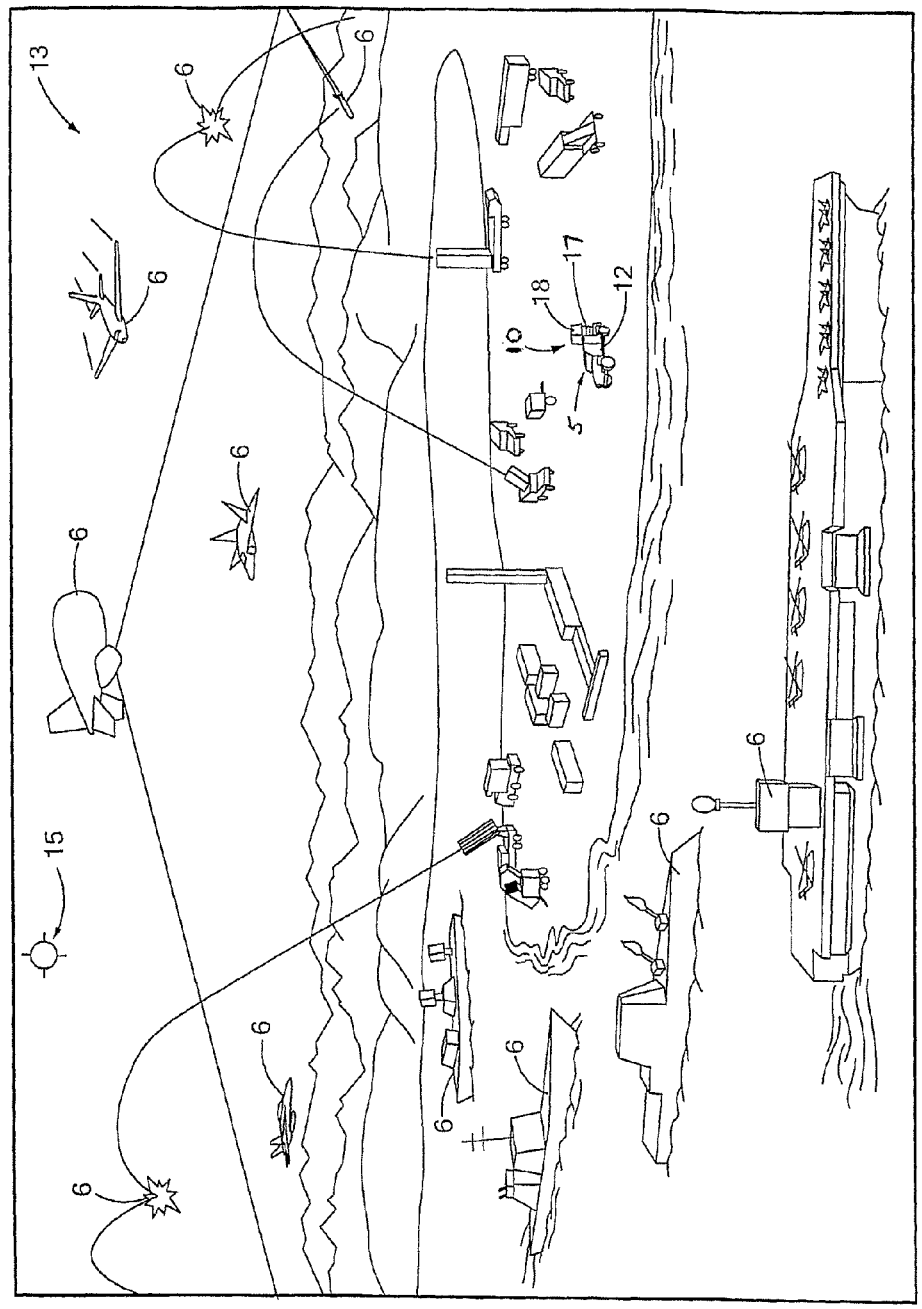
FIG. 1 is a diagrammatic view of a mobile radar system travelling in a battlefield with the mobile radar system provided from a vehicle having a phased array radar system disposed thereon and operating while the vehicle is moving.
Figure 1A:
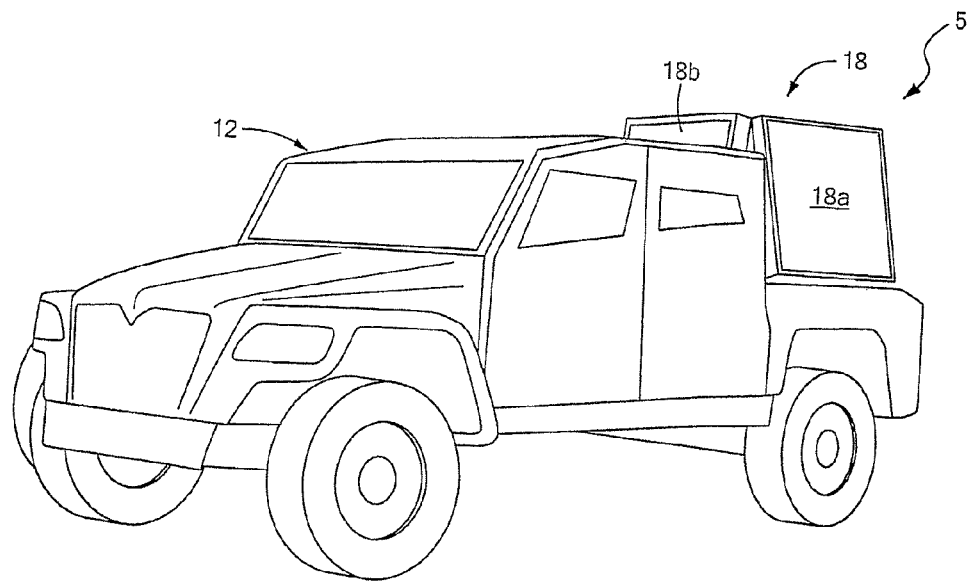
FIG. 1A illustrates a phased array radar system in a stowed position mounted on a ground based vehicle.
Figure 1B:
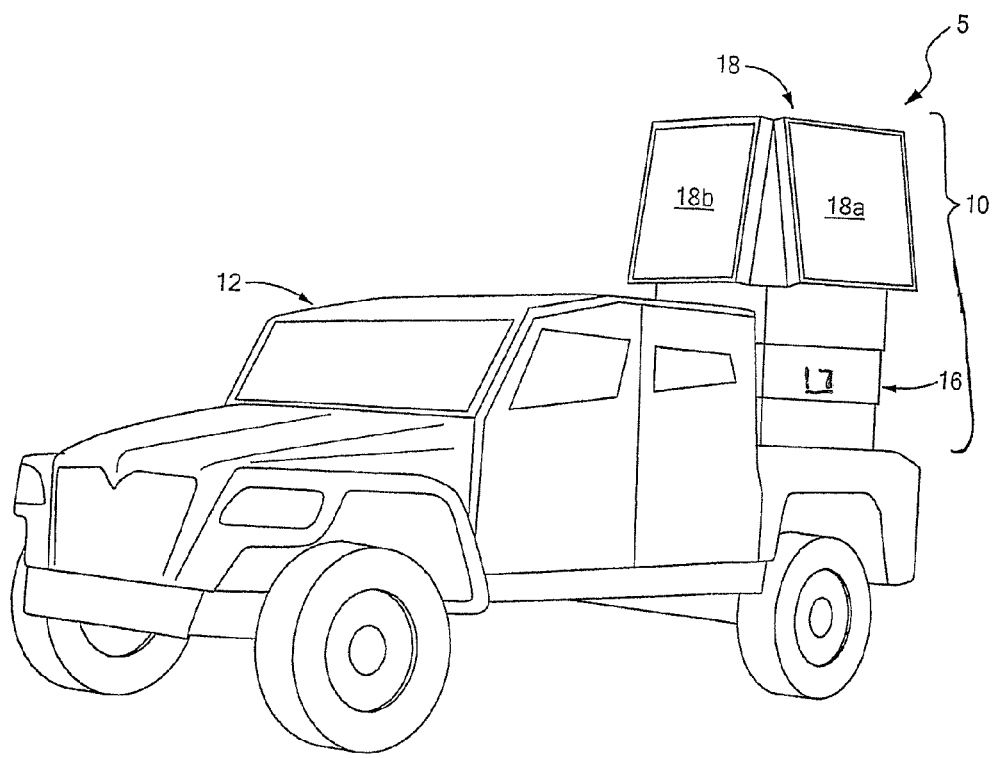
FIG. 1B illustrates a phased array radar system in a deployed position mounted on a ground based vehicle.
Figure 1C:
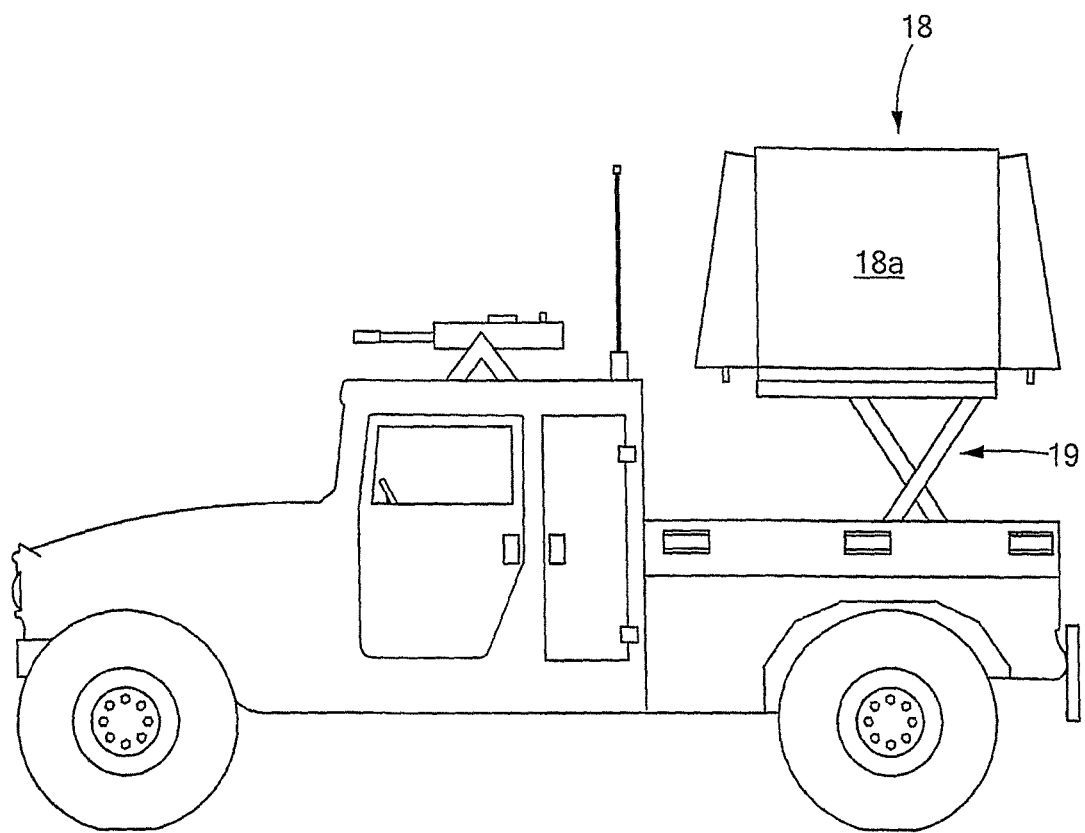
FIG. 1C illustrates a phased array radar system in a deployed position mounted on a ground based vehicle.

Referring now to FIGS. 1-1C in which like elements are provided having like reference designations throughout the several views, a mobile radar system 5 comprises a phased array radar system 10 disposed on a vehicle 12. Vehicle 12 travels in and around a battlefield area 13. Vehicle 12 may be provided, for example, as high mobility multi-purpose wheeled vehicle (HMMWV's) or any other vehicle suitable for a transport task. Vehicle 12 and phased array radar system 10 may travel in a variety of environments and terrains, with a clear battlefield environment (i.e. clear of fog, rain, snow, smoke, etc. . . . ) and both a relatively flat beach terrain and a mountain range terrain here being show. A global positioning system (GPS) coupled to phased array radar system 10 or vehicle 12 communicates with a GPS satellite 15.

Mobile radar system 5 tracks aircraft 6 or other objects via phased array radar system 10. Significantly, mobile radar system 5 is operational in either a fixed location (as shown in FIG. 1) or while vehicle 12 is on-the-move (i.e. even while vehicle 12 traverses the beach, or the mountainous terrain or follows any other path). Since mobile radar system 5 need not be in a fixed position when operating, mobile radar system 5 can avoid enemy attack and move where needed and thus is suitable for use proximate forward battle lines in direct support of troop operations.

Accordingly, troops which are on the move receive the benefits provided by mobile radar system 5 which can track a wide variety of objects such as enemy artillery, mortars and rockets and aircraft.

As will become apparent from the description provided herein below, in one embodiment, phased array radar system 10 comprises a plurality of so-called "panel arrays" combined with resource management systems and signal processing systems to provide the radar system 10 as an integrated, four-faced, active, electronically-scanned array (AESA) radar system capable of performing radar functions regardless of whether vehicle 12 is moving (and thus, phased array radar system 10 is moving) or whether vehicle 12 is stationary (and thus, phased array radar system 10 is stationary).

For an assortment of reasons including, but not limited to, mechanical difficulties, conventional, rotating single-faced antennas cannot operate while being transported. A rotating, single-face AESA, for example, is only operational when a vehicle transporting the rotating, single-face AESA is stationary (and thus the radar is at a fixed position).

Referring now to FIGS. 1A-1C, phased array radar system 10 comprises a movable antenna platform 16 (FIGS. 1A-1B) having an outer cover 17. Antenna platform 16 has a first portion configured to be mounted and attached to vehicle 12 and having a second portion to which an AESA antenna 18 is coupled. Thus, antenna platform 16 can be removed from the vehicle and mounted on another structure (e.g., the roof of a building) to provide surveillance protection for a base or compound. Platform 16 is selected having a size and strength sufficient to raise and lower AESA antenna 18. In one embodiment, platform 16 is provided as a telescoping platform.

AESA antenna 18 comprises four apertures (or "faces") 18a-18d with only face 18a visible in FIG. 1A and faces 18a, 18b visible in FIG. 1B. Preferably, the faces should be substantially identical in size and shape, but need not be so. In one embodiment, each aperture 18a-18d may be the same as or similar to panel array antennas 52 described below in conjunction with FIGS. 6-60 which in turn may be the same as or similar to a panel array of the type described in co-pending U.S. patent application Ser. No. 12/694,450, filed Jan. 27, 2010 which is a divisional of application Ser. No. 11/558,126 filed Nov. 9, 2006 now U.S. Pat. No. 7,671,696; or U.S. Pat. No. 6,624,787; or co-pending U.S. patent application Ser. No. 12/484,626, filed Jun. 15, 2009 all of which are assigned to the assignee of the present invention and incorporated herein by reference in their entireties.

In one embodiment, AESA antenna 18 can steer to any beam position within its hemispheric coverage within about 100 μsec.

In contrast, conventional systems (e.g. a system having a mechanically rotating AESA) have a revisit time no faster than 1 sec due to a maximum rate or speed at which the AESA can be rotated.

The advantages provided by electronic beam steering result in a number of radar performance advantages. For example, one advantage of mobile radar system 5 is an increase in "time-on-target" (which is one important radar parameter since signal-to-noise ratio (S/N), is a function of time-on-target). On a given search or track frame, the four-faced on-the-move radar can make up to 10,000 updates in 1 second.

Conventional systems such as a mechanical rotating AESA, on the other hand, provide about 1 update per second for a rotating AESA.

Another advantage of mobile radar system 5 described herein, is the ability to modify the electronic switch rate between AESA faces. In one embodiment, for example, a switching period of 100 μsec can be used for fast 360 degree volume sweeps or horizon-fence search sweeps. A slower electronic sweep rate (e.g., 1 millisecond) can be used when the AESA operates in a "track-while-scan" mode.

Another advantage of the mobile radar system 5 as compared with conventional systems is reaction time. Electronic switching provides fast reaction time to targets which suddenly appear in a given volume search (so-called "pop-up" targets) and enables radar resources to be rapidly focused as needed on the sector in which a target appears.

Another advantage of mobile radar system 5 is the ability to better track maneuvering targets with a revisit rate matched or substantially matched to estimated or measured acceleration profile(s) of the target(s) in track. Ultimately, this capability can result in a single-integrated-air-picture (SIAP) above a battlefield which is superior to that which can be provided by conventional systems.

As will be described in more detail below in conjunction with FIGS. 3 and 4, mobile radar system 5 also includes an on-board power source such as a generator (i.e. a generator mounted on vehicle 12) Generator 12 provides electrical power to AESA antenna 18 and associated electronics with radar system 10 in an amount sufficient that phased array radar system 10 can operate without the aid of any external power source. Thus, the phased array radar system 10 is said to be self-contained.

As evident from FIGS. 1A and 1B, antenna platform 16 is movable between a stowed position (FIG. 1A) and a deployed position (FIG. 1B). Significantly, AESA, antenna 18 is operable while antenna platform 16 is in either of the stowed or deployed positions. It should be appreciated that in the exemplary embodiment of FIGS. 1A and 1B, when antenna platform 16 is in its stowed position, one face (labeled with reference numeral 18b in FIGS. 1A, 1B) of antenna 18 is obstructed by a portion of vehicle 12. Thus, in this case, antenna 18 is operable to provide substantially 270 degrees of scan coverage. When antenna platform 16 is in its deployed position (FIG. 1B) however, antenna 18 is raised above a top-most surface of the vehicle 12 and thus is operable to provide substantially 360 degrees of scan coverage (i.e. when the movable platform raises the AESA antenna to a deployed position such that each face of said AESA antenna is above a top-most surface of the vehicle, the AESA antenna is able to electronically scan antenna beams substantially unobstructed by any portion of said vehicle).

In one embodiment, the phased array radar system is configured on movable platform such that the phased array radar system is capable of rotating (i.e. turning) on the movable platform. In one embodiment, the movable platform itself turns while in another embodiment, the movable platform stays substantially fixed and the phased array radar system coupled to the movable platform turns. Thus, when the movable platform raises the AESA antenna to a deployed position such that each face of said AESA antenna is above a top-most surface of the vehicle, the AESA antenna can physically rotate in addition to electronically scanning antenna beams substantially unobstructed by any portion of said vehicle.

Since antenna 18 is provided as a self-contained, four face, solid state AESA, phased array radar system 10 does not require any set up time to operate. That is, radar system 10 is operational when vehicle 12 is moving as well as when vehicle 12 is stationary. Thus, mobile radar 5 is continuously operational.

Accordingly, if mobile radar system 5 is deployed in a battlefield, it can begin operating as soon as it is deployed and continue to operate as it travels to a desired location. Once mobile radar system 5 reaches its desired location, vehicle 12 stops but radar system 10 continues to operate. If battlefield conditions dictate that mobile radar system 5 should move (e.g. mobile radar system 5 becomes a target of enemy gunfire or other attack), then mobile radar system 5 can move to a different location and phased array radar system 10 but will continuously operate during any movement. Since the four AESA faces 18a-18d provide substantially continuous 270° or 360° of scan coverage, the mobile radar system 5 can maintain target tracks even if the vehicle must turn while moving. Thus, the mobile radar system 5 flexibility to adapt to situational battlefield developments.

It should be appreciated that, in one embodiment, when a volume scan is being performed, a predetermined pattern (i.e., a pre-programmed beam scan pattern) is used. It should be appreciated that in a tracking mode while the vehicle is moving, it is possible to lose a track due to perturbances which occur from movement of the vehicle (i.e., bumps in a terrain being travelled, etc. . . . ). Thus, in such cases, the mobile radar system utilizes the fact that there is a certain amount of predictability in target movement as well as the beam agility in an AESA antenna. Accordingly, if a target moves out of an antenna field of view (FOV), then the AESA antenna can, for example, switch to an adjacent aperture on the same face or can switch to a different aperture on a different face of the AESA antenna.

By providing a mobile radar system 5 which can continuously operate, it is possible to achieve high levels of track consistency, continuity and clarity in a battlefield environment. This significantly contributes to the formation of a single-integrated-air-picture (SIAP) in a complex, multiple-threat, multiple-friendly environment. Thus, mobile radar system 5 provides enhanced radar performance in any environment or application in which ground radar systems may be used.

Also, in embodiments in which phased array radar system 10 comprises four faces 18a-18d which provide substantially continuous 360 degrees of coverage (in the deployed antenna platform position), search raster rates are not limited as in conventional radars which utilizes a rotator antenna. Rather, mobile radar system 5 is adaptable to a current threat limited only by the speed at which beams can be electronically switched, targets can be acquired and tracks can be formed.

Furthermore, elimination of a rotating antenna aperture significantly simplifies signal interfaces between the AESA antenna and a radar signal processor, prime power and receiver/exciter sub-systems and thus mobile radar system 5 is provided having improved reliability compared with conventional systems which utilize a rotating antenna structure.

Furthermore, by providing a plurality of AESA faces (e.g. four AESA faces) that can be electronically switched in any sequence, the mobile radar 5 also eliminates at least two drawbacks of so-called "sit-and-spin" radars. First, as previously mentioned, mobile radar system 5 is capable of operating while vehicle 12 is both in a fixed position and while vehicle 12 is in motion (e.g. using prime power provided by the vehicle). Second, electronic scan by a plurality of AESA faces vastly enhances search update rates and allows greater flexibility in scheduling radar waveforms. For example, since each AESA antenna can be treated as a separate radar, each AESA face can be autonomously operated (i.e., face 18a could be operating in a search mode at one instant while face 18b could be operating in a track mode at substantially the same instant). This allows different sectors to be scanned according to threat. Thus, mobile radar system 5 provides substantially continuous 360 degree coverage capability even while tracking a threat in a given sector.

This is in stark contrast to the operation of a mechanically rotating radar which provides 360° of coverage since once a rotating radar stops and focuses resources on a given sector, the radar is now completely blind to target that may enter the now ignored sectors.

Furthermore, the when mobile radar system 5 comprises a phased array radar system 10 made up of a plurality of panel arrays, mobile radar system 5 can track highly maneuvering, low radar cross-section (RCS) targets at rates which are orders-of-magnitude faster than that achievable in rotator radars. By mounting phased array radar system 10 in a highly mobile ground based vehicle 12 which can enter a battlefield area, a mobile radar system is provided which can achieve high levels of track consistency, continuity, and clarity that can significantly contribute to the formation of a single-integrated-air-picture (SIAP) in complex, multiple threats, multiple-friendly environments.

Furthermore since mobile radar system 5 provides substantially 360 degree coverage while moving or stopped (e.g. parked), the threat of the radar itself becoming a target is reduced because the radar need not stay in one location at all times.

This is in contrast to prior art systems which operate at a fixed location for an amount of time which allows an enemy to identify a location of the radar and thus make the radar location a target.

Referring now to FIG. 1C, in one embodiment, movable antenna platform 16 is provided as a scissors jack structure 19 which raises and lowers phased array radar systems 10. In preferred embodiments, the telescoping structure is preferred given its rigidity and distributed support; in addition, it can enclose some of the electronics (e.g., beam steering computer and system monitoring/control; navigational equipment) from the weather.

Figure 2:
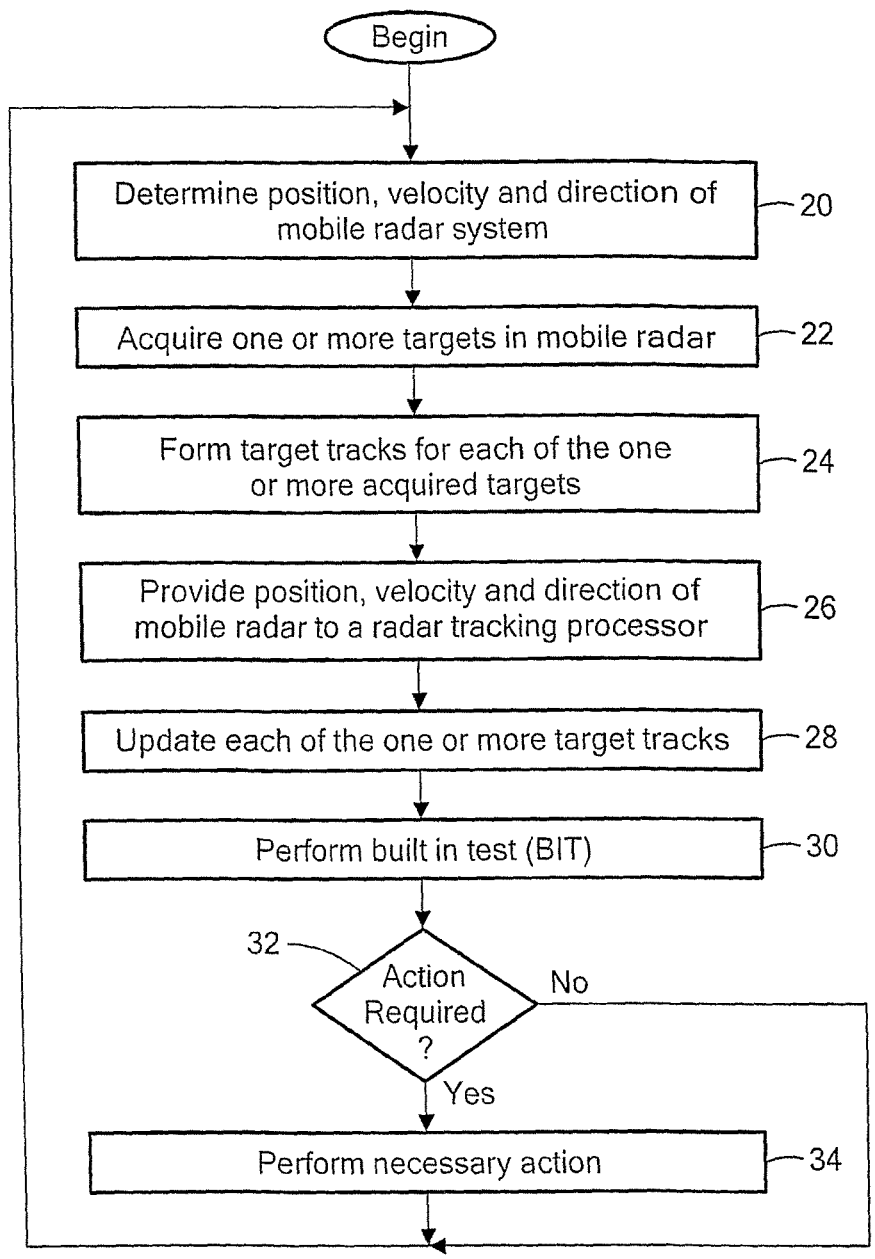
FIG. 2 is a flow diagram of a method of operating a mobile radar system.

Referring now to FIG. 2, a flow diagram illustrating an exemplary technique for operating a mobile radar system, such as mobile radar system 5 described above in conjunction with FIGS. 1-1C, is shown. It should be appreciated that unless otherwise specifically indicated, the order in which the individual steps are performed may be varied from that shown in FIG. 2.

Turning now to FIG. 2, processing begins as shown in block 20 by determining a position, velocity and direction of a mobile radar system. In one embodiment, the position, velocity and direction are determined by acquiring the information from a navigation system and/or one or more other systems disposed in or on a ground based vehicle (e.g. vehicle 12 in FIGS. 1-1C) and/or disposed in or on a phased array radar system coupled to the vehicle such as phased array radar system 10 described above in conjunction with FIGS. 1-1C. In one embodiment, the navigation system comprises an inertial measurement unit, (IMU) and a global positioning system (GPS). In one embodiment, the navigation system may also include one or more of: an internal and/or external accelerometer/speed sensors, a barometric system (for altitude correction) and a magnetic compass.

Processing then flows to blocks 22 and 24 where one or more targets are acquired by the mobile radar system and target tracks are formed for each of the one or more acquired targets.

In processing block 26, since the radar system is mobile, position, velocity and direction of the mobile radar system is provided to a processor (e.g. a radar tracking processor) and in processing block 28 each of the one or more tracks are updated as needed to account for movement of the mobile radar system. In one embodiment, the mobile radar system uses a so-called "batch tracking algorithm" and the data provided to the radar tracking processor (or other processor) is used to correct and/or smooth target tracks.

As shown in blocks 30-34, periodically, the system may perform a built-in-test to determine if any action (e.g. re-calibration of a phased array antenna) is required. If any action is necessary, then processing flows to block 34 and if no action is necessary, then processing returns to the beginning of the process (which in this exemplary case is processing block 20).

Figure 3:
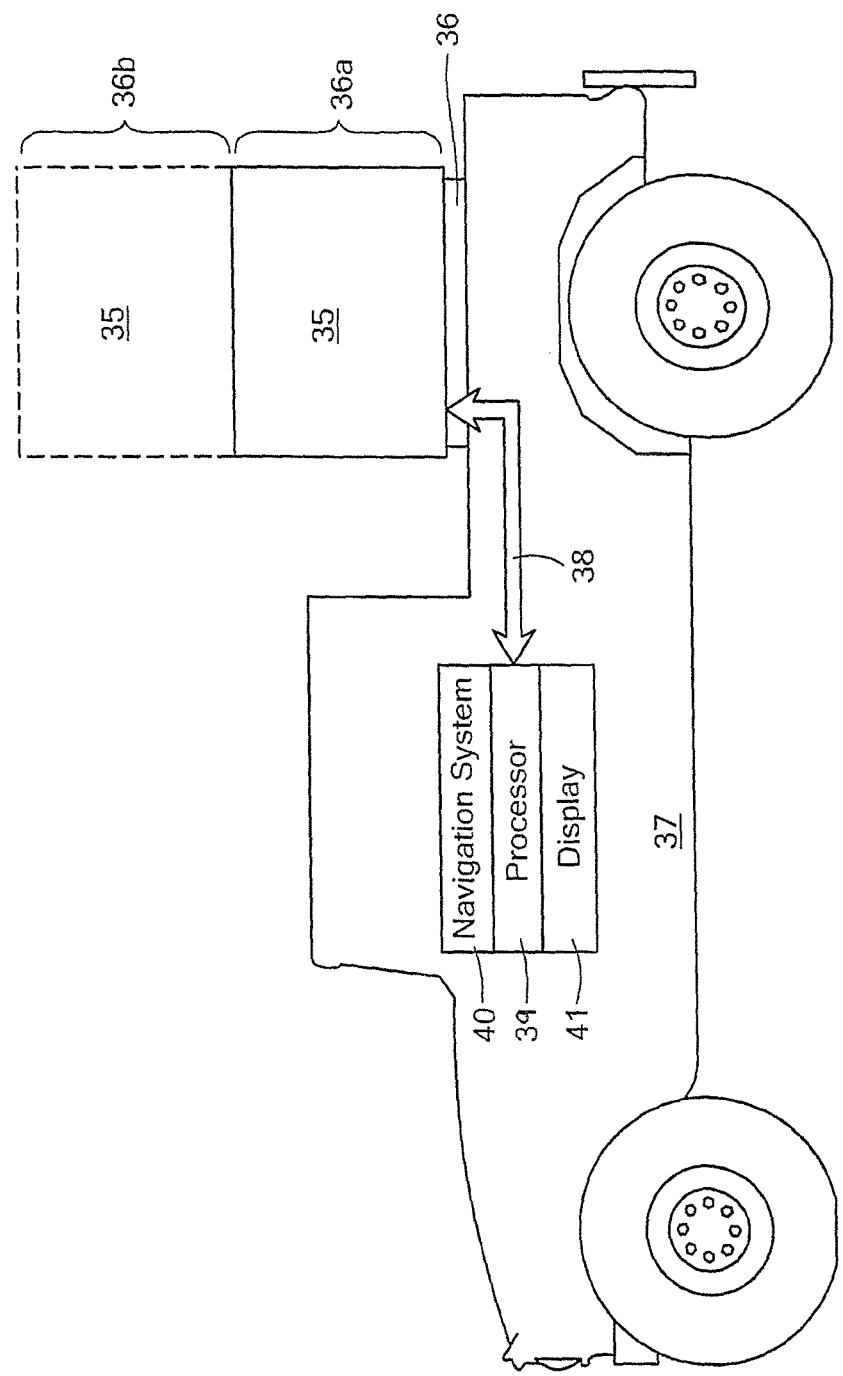
FIG. 3 is a block diagram of a mobile radar system mounted on a ground based vehicle.

Referring now to FIG. 3, a phased array radar system 35 is disposed on a telescoping radar mounting platform 36 which can be raised and lowered thereby raising and lowering phased array radar system 35 between one of a stowed position 36a and a deployed position 36b. Significantly, phased array radar system 35 operates in both the stowed and deployed positions. Mounting platform 36 is, in turn, disposed on a mobile ground vehicle 37.

In the embodiment shown in FIG. 3, phased array radar system 35 is coupled, via a communication path 38 to a processor 39, (e.g. a radar processor), a navigation system 40 and a display 41 all of which are disposed in or about a cab of vehicle 37. Significantly, communication path 38 does not carry any high power RF or DC signals.

Although radar processor 39, navigation system 40 and display 41 are shown physically separate from, but electrically coupled to phased array radar system 35, it should be appreciated that in some embodiments, some or all of radar processor 39, navigation system 40 and display 41 may be provided as a physical part of phased array radar system 35 (i.e. electrical circuits and systems which make up radar processor 39, navigation system 40 and display 41 may be disposed in the same physical structure which makes up phased array radar system 35). Operation of radar processor 39, navigation system 40 and display 41 will be described below in conjunction with FIG. 4.

Figure 4:
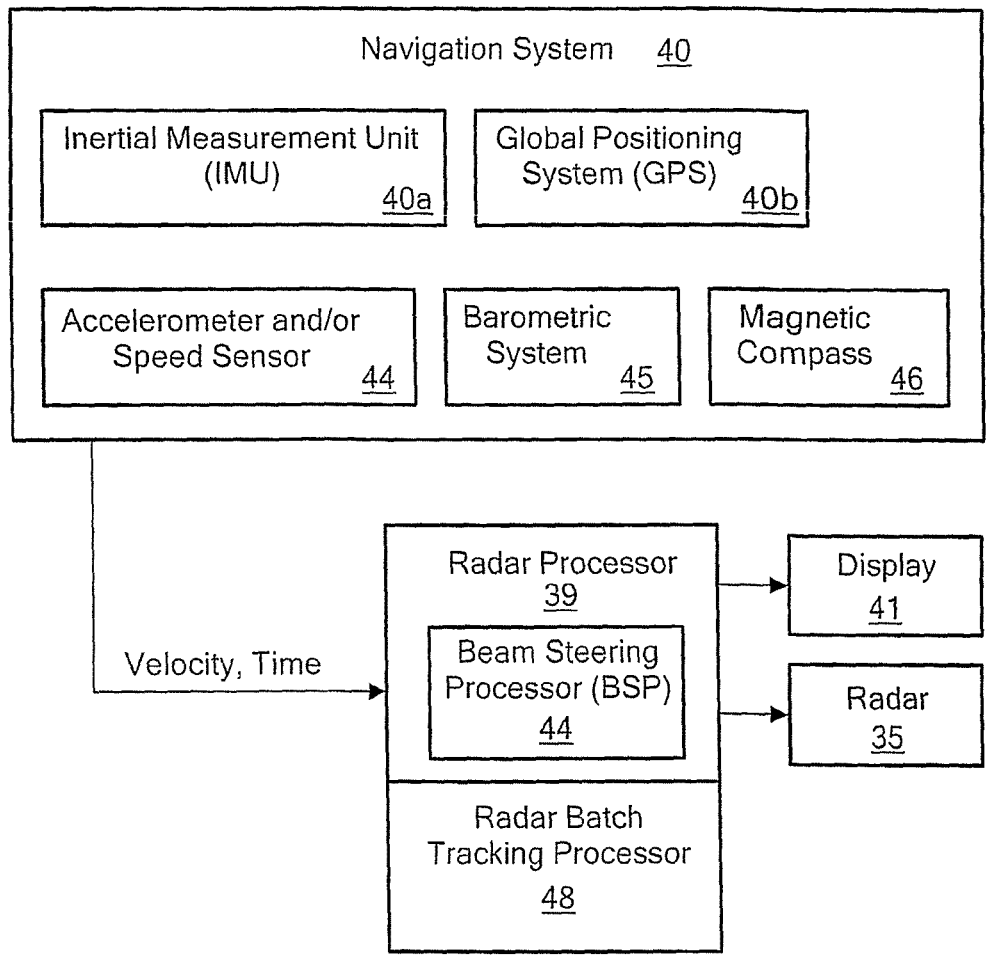
FIG. 4 is a block diagram of mobile radar system electronics.

Referring now to FIG. 4, in one embodiment, phased array radar system 35 (FIG. 3) includes radar processor 39, navigation system 40 and display 41. Navigation system 40 measures and tracks current position and velocity of phased array radar system 35. In one embodiment, navigation system 40 comprises inertial measurement unit (IMU) 40a and global positioning system (GPS) 40b (e.g. to conduct communications with a GPS Satellite such as Satellite 15 shown in FIG. 1).

As is known, IMU 40a measures and reports on an object's acceleration, velocity, orientation, and gravitational forces, typically using a combination of accelerometers and gyroscopes. IMU 40a also detects changes in rotational attributes like pitch, roll and yaw using one or more gyroscopes.

GPS 40b may be provided, for example, as a space-based global navigation satellite system that provides reliable location and time information in all weather and at all times and anywhere on or near the Earth when and where there is an unobstructed line of sight to four or more GPS satellites. GPS 40b provides a current position and a velocity of phased array radar system 35 to other system components as needed. The velocity and time data collected from navigation system 40 is fed to processor 39 (e.g. radar processor 39) which computes a current position and velocity of vehicle 37 (FIG. 3) which is substantially the same as the current position and velocity of phased array radar system 35 (FIG. 3). Data from navigation system 40 is used, for example, in a so-called "batch-tracking" processor 48 which functions to correct and/or smooth target tracks of the phased array radar.

Navigation system 40 may also optionally include an external accelerometer/speed sensor 44, a barometric system 45 (for altitude correction) and a magnetic compass 46 which provides direction information.

Processor 39 performs AESA command, control and signal processing. Each AESA face of the phased array radar system 35 receives beam-steering commands (e.g. commands which control phase shifter and attenuator settings within the AESA) from a beam steering processor (BSP) 44. BSP 44 also performs AESA built-in test (BIT) and fault status monitoring.

As mentioned above, in one embodiment, phased array radar system 35 utilizes a form of radar signal processing referred to as "batch tracking" which is a known operational radar tracking algorithm used in radars. As is known, batch tracking is a self-correcting, or iterative, algorithm that corrects or smoothes the radar track measurement based on time stamped measurements provided by the processor 39 (which includes a signal data processor) and navigation system 40.

Figure 5:
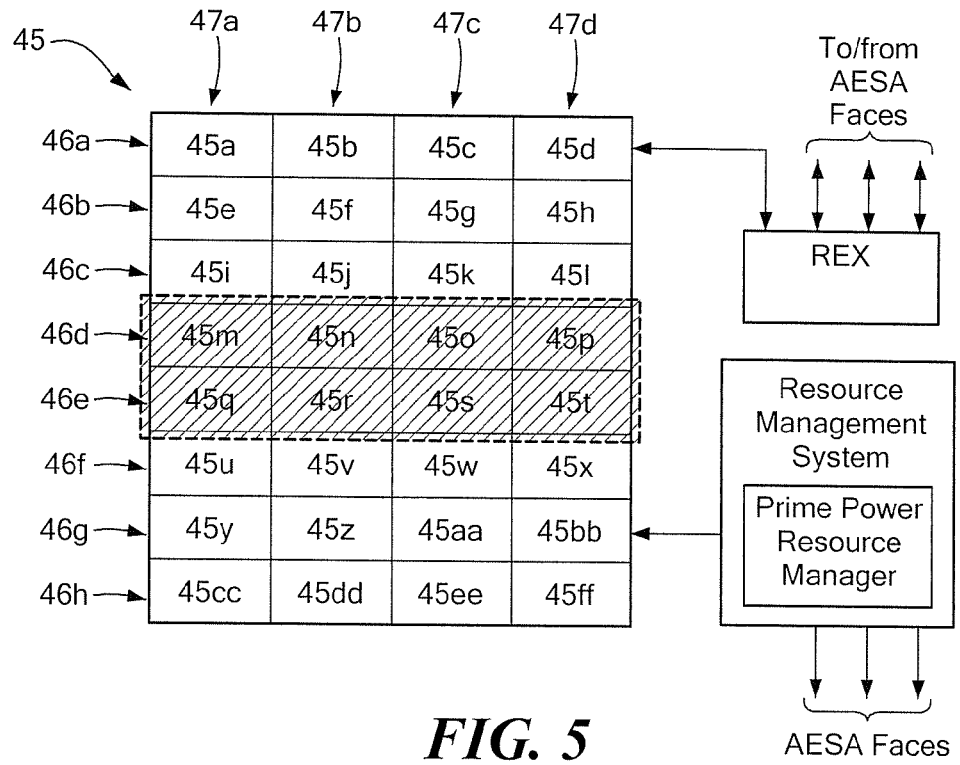
FIGS. 5 and 5A are block diagrams of an active, electronically-scanned array (AESA) antenna face made up of an array of individual panels and illustrating different active panels on the AESA antenna face.
Figure 5A:
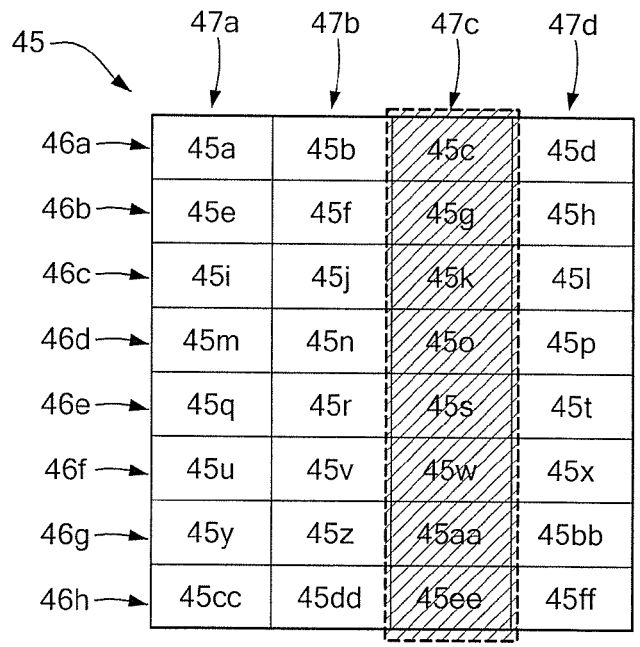

Referring now to FIGS. 5 and 5A, an exemplary AESA face 45 which may be the same as or similar to AESA faces 18a-18d described above in conjunction with FIG. 1-1C), includes a plurality of rows and columns, here, eight (8) rows 46a-46h and four (4) columns 47a-47d which results in a total of thirty-two (32) individual panels 45a-45ee. Thus, AESA face 45 is made up of an array of individual panels, here thirty-two panels each of the thirty-two panels corresponding to a so-called "building block."

It should be understood that each of the individual panels 45a-45e acts as a so-called building-block which allows AESA faces of differing sizes to be built. Thus, the number of panels to include in any AESA face could be greater than or fewer than thirty-two. One of ordinary skill in the art will appreciate how to select a particular number of panels to use in an AESA face for a particular application.

Each individual panel (or building block) is made up of a selected number of transmit-receive (TR) channels. The number of TR channels included in an individual panel is selected depending upon the needs of a particular application. One of ordinary skill in the art will understand how to select a number of TR channels to include in a panel for a given application. In one embodiment, each panel 45 is provided having thirty-two (32) individual TR channels. In another embodiment, each panel is provided having 128 TR channels.

As discussed above, in a mobile radar system comprising a plurality of AESA faces (e.g. four AESA faces) which can be electronically switched in any sequence, each AESA can be treated as a separate radar. That is, each AESA face can be autonomously operated. For example, at one instant in time, one AESA face could be operating in a search mode while a second different AESA face could be operating in a track mode. This allows different sectors to be scanned according to threat.

Accordingly, different panels on different AESA faces may be active (or energized) at the same (or different) points in time. For example, in FIG. 5, two rows of panels 46d, 46e in AESA 45 can be active while in FIG. 5A, a single column 47d of panels can be active. Thus, FIGS. 5 and 5A illustrate two different possibilities of energizing eight (8) panels in AESA faces. It should be noted that it is necessary to activate a certain minimum number of panels for proper radar operation in a particular application. For example, in some embodiments and applications, it is necessary to activate eight panels in EL or at least four (4) panels in AZ for proper operation of a monopulse network.

Although FIGS. 5 and 5A illustrate rows and columns of AESA face 45 being active, it should be appreciated that any combination of panels on a given AESA face, or between AESA faces, may be active in a given time frame. Active panels on an AESA face need not be in the same column or row. Any (or in some instances, all) of the plurality of panels in given AESA face may be active. The ability to selectively turn on/off panel building-blocks in a mobile radar system results in a mobile radar system which can function in a plurality of different operating modes.

For example, mobile radar system 5 (FIGS. 1-1C) may operate in a switched 360° radar coverage mode. In this mode, one AESA face is fully energized in a given time frame while the other three AESA faces (or two faces if the system is "on-the-move" and thus in a stowed position) are in standby power mode. Any sequence of turning on/off an AESA face is allowed.

Mobile radar system 5 (FIGS. 1-1C) may also operate in a simultaneous, wide-area sector radar coverage mode. In this operating mode, the four-face mobile radar can have combinations of simultaneously energized AESA faces sharing the total available prime power in transmit and/or receive. For example, to achieve up to 180° coverage, one could energize two contiguous AESA faces. For example, sixteen panels can be turned on in a first AESA face and sixteen panels can be turned on in a second AESA face. To achieve up to 270° coverage, one could energize three AESA faces. For example, eight panels can be activated on a first AESA face, sixteen panels can be activated on a second AESA face and eight panels can be activated on a third AESA face. To achieve up to 360° coverage, one could energize all four AESA faces. For example, eight panels can be activated on each of the four AESA faces.

Thus, by providing the mobile radar system as a self-contained, solid-state AESA having four faces, the radar can simultaneously operate sub-apertures for the following modes of operation: (1) transmit from one face and receive sub-aperture from any of the remaining three faces; (2) simultaneously operate sub-apertures on all four faces in a transmit mode; and (3) simultaneously operate sub-apertures on all four faces in a receive mode.

Furthermore, the mobile radar system is capable of multi-face AESA operation. Any combination of AESA faces may be commanded in a given resource period. Digital commands are sent from the BSP to a given AESA face in a given resource period; status is sent from the AESA face to the BSP.

Accordingly, a mobile radar system is provided which has the ability to rapidly adapt to the needs of many situational battlefield developments and scenarios.

A central receiver/exciter (REX) provides frequency excitation and waveform generation in a radar transmit mode. The REX also provides matched filter/waveform processing and extraction on a radar receive mode. Transmit and receive ports are electronically switched between each AESA face and the REX.

In single-face AESA operation, the REX communicates with a single AESA face in a given time frame. In this mode of operation, the REX is configured to provide one transmit port; three receive ports (three receive ports per AESA face for a three-channel monopulse system). In single-face AESA operation, in a given radar resource time frame, a single AESA face is energized and communicates with the BSP and REX and provides status. Three-channel monopulse receive data is processed by a processor such as a signal data processor (SDP).

In four-face AESA operation, the REX simultaneously communicates with any combination of AESA faces. In this mode of operation, the REX is configured to provide four transmit ports and twelve receive ports (three receive ports per AESA face for three-channel monopulse). In four-face AESA operation, in given radar resource time frame, up to four AESA faces are energized with simultaneous communication with the BSP and REX and each AESA face provides status. Again, three-channel monopulse receive data from each AESA face is processed by a processor such as a signal data processor (SDP).

In one embodiment, the mobile radar system includes a scalable, three channel monopulse, which may be the same as or similar to the type described in co-pending U.S. application Ser. No. 12/757,371 assigned to the assignee of the present invention and incorporated herein by reference in its entirety. In one embodiment, each AESA face is one square meter ($1\ m^2$) and is comprised of thirty-two 128 TR Channel Panel Array building-blocks, which incorporate a position-invariant monopulse beamforming network.

The mobile radar system includes a resource management system to schedule and control the following radar system resources: prime power; radio frequency excitation, wave-form and signal processing; computing; thermal management, mechanical sensing; built-in test. A resource management timeline is based upon radar resource period(s) and resource scheduling is controlled by the radar signal processor. Resource management is based upon various radar mission scenarios and is implemented to each AESA face through electronic switching of prime power, RF waveform excitation and control of the thermal management system and the central computer and REX.

A prime power resource management system uses electronic commutation from a central prime power generator to each AESA panel. The speed of commutation is achieved by digital command recognition to allow a given AESA face (or one or more panels on an AESA face) to energize/de-energize in a desired (or required) time frame. In one embodiment of the mobile radar system, there are two basic modes of resource management.

A first mode of resource management is referred to as "prime-power time-sharing." In this mode, all available prime power is dedicated to a single AESA face, in transmit and/or receive, in a given time frame. The remaining three AESA faces are in standby power mode (e.g. a small amount of total prime power, for example, in the range of about 1%-5% of total prime power).

A second mode of resource management is referred to as "prime-power splitting". In any given time frame, prime power can be split between a plurality of AESA faces (e.g. four faces) in multiples of panel building-blocks. For example, in a system in which each AESA face comprises thirty-two panels, each having 128 TR channels, the total prime power usage is the same whether all thirty-two 128 TR channel panels on one given AESA face are energized in transmit (or receive) or, one-quarter (i.e. eight) of the 128 TR Channel Panels can be energized in Transmit (or Receive) on each of the four faces.

In an AESA fault status monitoring mode, each AESA face is continuously monitored with status read-back provided to the BSP. Critical parameters such as power, coolant flow rate (for liquid-cooled version), fan status (for air-cooled version), temperature, are monitored and AESA antenna operation is shut-down if any parameter moves outside a desired range.

Also each AESA face has an independent, embedded antenna element (e.g. a patch antenna element) measurement system used to perform built-in-test (BIT).

For each AESA face, BIT is used to perform a variety of functions including, but not limited to: monitoring of TR channel RF performance and performance of re-calibration of active TR channels. In one embodiment, reference patches embedded around the periphery of each AESA face are used to couple portions of transmit and receive signals to each TR channel in the AESA antenna. These measurements are used to determine if a given TR channel on a given AESA face has degraded in performance (e.g., phase and/or receive amplitude drift or transmit output power degradation) or failed. The central computer computes the antenna pattern residual error between "in-field" reference patch measurements and factory reference patch measurements. Based upon this residual error, the central computer reports the new error floor and either: (1) performs a re-calibration of the degraded AESA face without replacement of a panel; or (2) performs a re-calibration of the degraded AESA face with replacement of one or more panels; or (3) does nothing.

In one embodiment, BIT is performed at least in stand-by and operating modes.

In stand-by mode, the AESA face is not in normal transmit/receive mode operation, but is supplied power to maintain digital control. In this mode, reference patch measurements are interleaved between radar resource periods.

In normal operating mode, the AESA face is in normal transmit-receive mode and reference patch measurements are interleaved between radar resource periods.

In one embodiment, a central receive-exciter (REX) provides frequency excitation and waveform generation in radar transmit mode; and provides matched filter/waveform processing on radar receive mode. Excitation of AESA face transmit and receive ports is performed by electronic switching between the AESA face and the REX.

Figure 6:
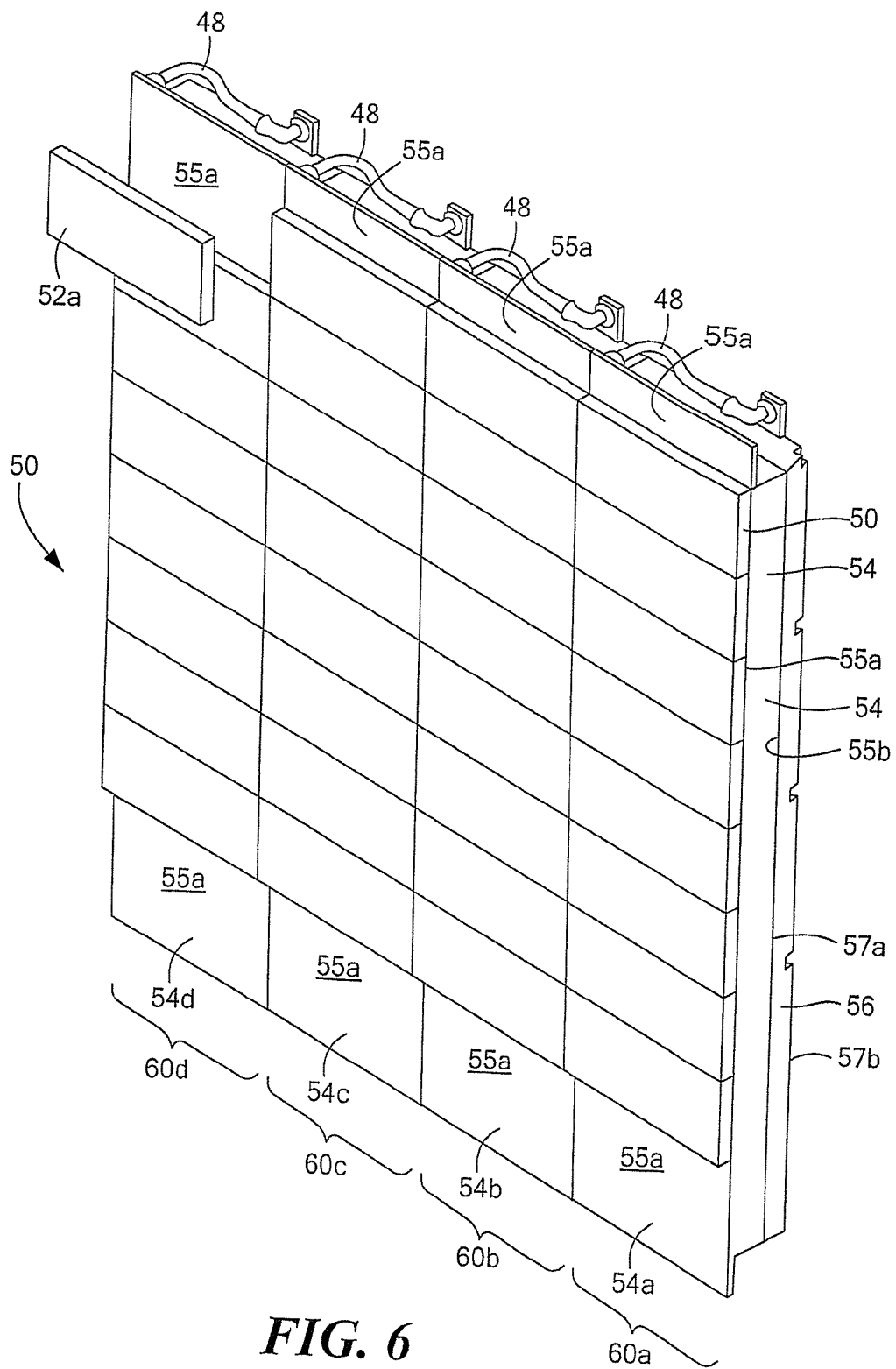
FIG. 6 is a front isometric view of an AESA antenna face made up of a plurality of panel arrays.
Figure 6A:
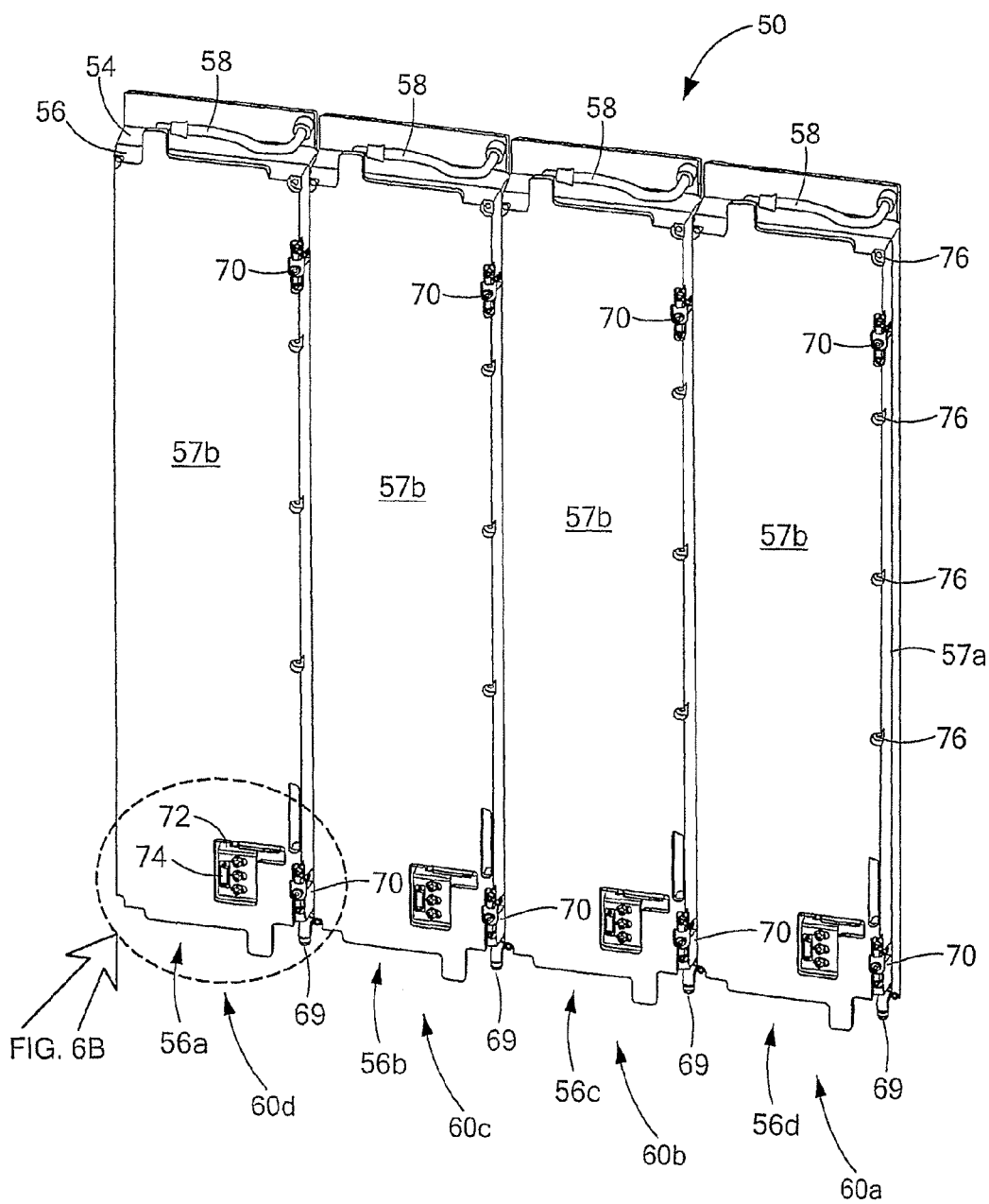
FIG. 6A is a rear isometric view of a panel array illustrating a line replaceable unit (LRU)
Figure 6B:
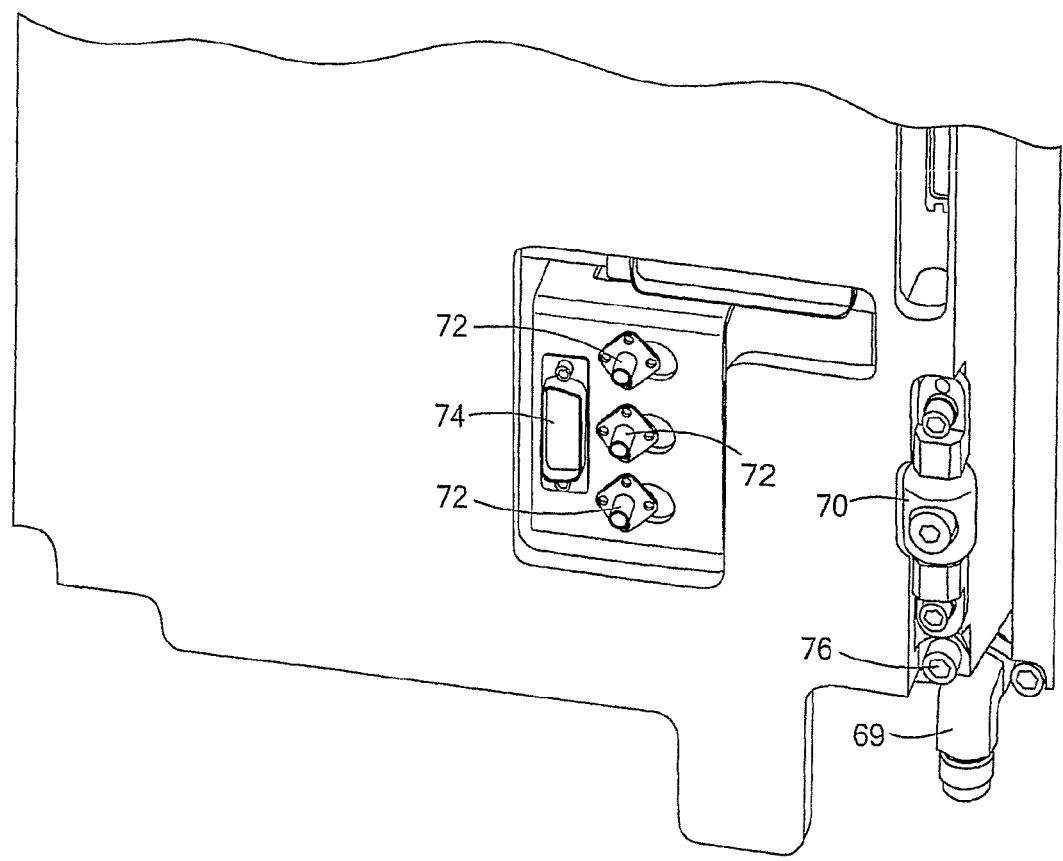
FIG. 6B is an isometric view of a portion of the panel array shown in FIG. 6A.
Figure 6C:
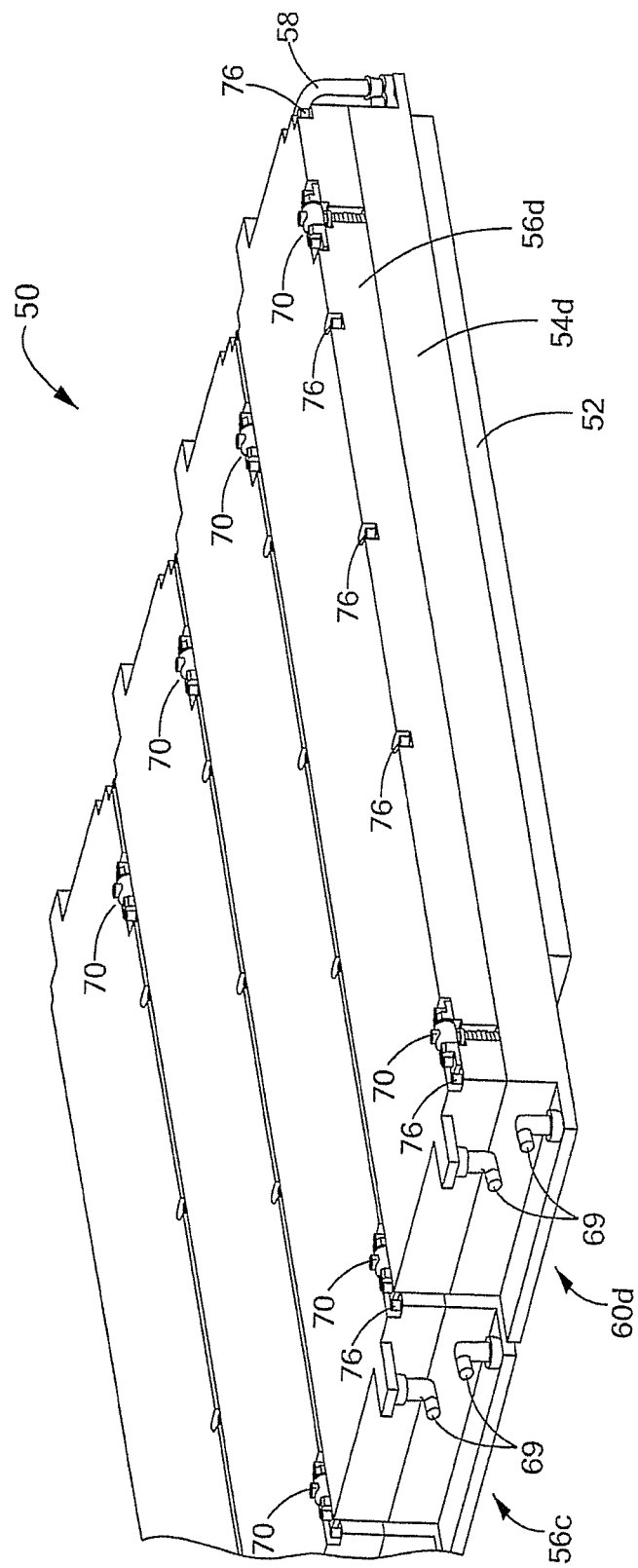
FIG. 6C is an isometric view of a portion of the panel array shown in FIG. 6A.

Referring now to FIGS. 6-6C, in which like elements are provided having like reference designations throughout the several views, in one exemplary embodiment, phased array radar system 10 (FIGS. 1-1C), includes four faces 18a-18d (FIGS. 1A-1C) with each face corresponding to an AESA having an area of approximately one square meter (1 $m^2$). In a preferred embodiment, each of the ASEA's four faces 18a-18d are provided as panel array antennas 52 (FIGS. 6-6C).

In one embodiment, each AESA antenna 50 is provided from a plurality (or array) of panel array antennas 52a, generally denoted 52 (sometimes referred to herein as a "panel arrays," "antenna panels" or more simply as "panels 52"). Thus, AESA antenna 50 is said to have a "panel architecture." One example of an antenna panel is described in U.S. Pat. No. 7,384,932 assigned to the assignee of the present invention.

In preferred embodiments, the antenna panels 52 are stand alone units. That is, the panels 52 are each independently functional units (i.e. the functionality of one panel does not depend on any other panel). For example, the feed circuit for each panel 52 is wholly contained within the panel itself and is not coupled directly to any other panel. Thus, in the event that one panel 52 fails, the failed panel 52 may simply be removed from the array of panels which form AESA antenna 50 and another panel can be inserted in its place. This characteristic is particularly advantageous in RF transmit/receive systems deployed in sites or locations where it is difficult to service the RF system in the event of some failure.

As described in the aforementioned U.S. Pat. No. 7,384,932, it is preferable for the antenna panels used in antennas having a panel architecture to maintain a low profile. This can be accomplished by utilizing a plurality of multilayer circuit boards which provide one or more circuit assemblies in which RF and other electronic components are disposed in close proximity with each other. The operation of such electronic components utilizes electrical power and thus the components dissipate energy in the form of heat. Thus, the antenna panels 52 must be cooled.

As shown in FIGS. 6-6C, array antenna 50 (and more specifically RF panels 52) are coupled to a panel heat sink 54. In this exemplary embodiment, heat sink 54 is comprised of a plurality, here four, separate sections 54a-54d. A first surface of each heat sink section 54a-54d is designated 55a and a second opposing surface of each heat sink section 54a-54d is designated 55b. Thus, RF panels 52 are coupled to the first surface 55a of heat sink 14.

A rear heat sink 56 is coupled to surface 55b of heat sink 54. In this exemplary embodiment, rear heat sink 56 is comprised of a plurality, here four, separate sections 56a-56d (FIG. 3A). A first surface of each heat sink section 56a-56d is designated 57a and a second opposing surface of each heat sink section 56a-56d is designated 57b. Thus, portions of heat sink surface 55b contact portions of heat sink surface 57a.

A set or combination of heat sink sections and associated panels can be removed from the array and replaced with another set of heat sink sections and associated panels. Such a combination is referred to as a line replaceable unit (LRU). For example, heat sink sections 54a, 56a and the panels dispose on heat sink section 54a form a LRU 60a. Thus, the exemplary system of FIG. 1 comprises four LRUs 60a-60d with each of the LRUs comprised of eight panels 52, one of panel heat sink sections 54a-54d and a corresponding one of rear heat sink sections 56a-56d.

In one embodiment, each 1 $m^2$ AESA face is comprised of thirty-two 128 TR channel panel array "building-blocks" using a position-invariant analog monopulse beamforming network. All active and passive components are surface mounted to the panel array. Each TR channel uses "flip-chip" mounted monolithic microwave integrated circuits (MMIC) with an integral heat spreader attached to the backside of each MMIC. The mobile radar system combines hardware (e.g. a modular, scalable panel array combined with an on-board navigation system, a central computer system, a receiver-exciter, and a thermal management system) with resource control to produce an on-the-move radar capability.

Referring now to FIG. 6A, panel 50 includes a modular line replaceable unit (LRU) 60. In this exemplary embodiment, there are four weather-tight, electromagnetic interference (EMI) shielded LRU's per each square meter. The LRU includes eight panels, a brazement 62 to cool the panels, four active monopulse combiner network assemblies, four power-logic circuit cards, four distribution boards, four linear regulators (LR), eight DC/DC converters, a brazement to cool the DC/DCs and LR's, and a bus bar. In one exemplary embodiment, the LRU is approximately 46 in (high)×10 in (wide)×4 in (deep) and the LRU weight is estimated to be 64 lbs. The LRU approach provides several advantages: (1) LRU's allow easy access to signal and coolant lines; (2) LRU's can be removed or inserted into the face of an AESA in a short amount of time; (3) LRU weight allows replacement to be accomplished manually (e.g. it is a two-man lift); and (4) the LRU approach reduces associated costs of packaging and cooling an array.

In one embodiment, panel heat sink sections 54a-54d and rear heat sink sections 56a-56d are provided having a "U" shaped cross sectional shape. Thus, when the panel heat sink sections 54a-54d and corresponding rear heat sink sections 56a-56d are coupled an internal cavity is formed therebetween in which power and logic circuits/electronics are disposed.

It should be appreciated that in other embodiments other heat sink configurations may be desired or required. For example, only one of the heat sinks 54, 56 may be provided having a recess region with electronics disposed therein. Alternatively, in some embodiments, neither of the heat sinks 54, 56 may be provided having a recess region. The particular manner in which to provide the heat sinks and in which to couple the electronics depends upon the particular application and the factors associated with the application.

In one embodiment, heat sinks 54, 56 are provided as so-called cold plates which utilize fluid to cool any heat generating structures (such as panels 52 and electronics) coupled thereto. A fluid is fed through channels (not shown) provided in the heat sinks 54, 56 via fluid fittings 69 and fluid paths 58. It should be appreciated that each of the heat sinks 54, 56 may be comprised of a plurality of different components or subassemblies coupled together or alternatively heat sinks 54, 56 may be provided as monolithic structures. In other embodiments, air cooling can be used.

Since the electronics are disposed between a surface of the panel heat sink and an internal surface of the rear heat sink, the electronics are not accessible when the panel heat sink 54 and rear heat sink 56 are coupled as shown in FIGS. 3-3C. Thus, to provide access to the recess region of the rear heat sink 56 (and thereby provide access to the electronics disposed in the recess region of rear heat sink 56), one or more translating hinges 70 couples panel heat sinks 54*a*-54*d* to respective ones of rear heat sinks 56*a*-56*d*. Thus, the translating hinges allow access to the electronics disposed in recess regions thereby facilitating disassembly and rework of the electronics (or portions thereof) and/or heat sinks (or portions thereof) when needed. The translating hinges 70 may be the same as or similar to the type describe in co-pending U.S. patent application Ser. No. 12/465,120 filed May 13, 2009, assigned to the assignee of the present invention and incorporated herein by reference in its entirety.

Heat sinks 54*a*-54*d* are coupled to heat sinks 56*a*-56*d* via a plurality of fasteners 76 and a plurality of translating hinges 70. In the exemplary embodiment shown herein, fasteners 76 are provided as screws which are captive in heat sink 56 and which mate with threaded holes provided in heat sink 54. It should be appreciated that one of ordinary skill in the art will understand how to select an appropriate type and number of fasteners 76 to use in any particular application. In one embodiment, fasteners 76 may be provided as spring-loaded, captive screws.

Referring now to FIG. 6B, a portion of a panel 50 includes a plurality, here three, RF connectors 72. RF transmit and receive signals, e.g. Az, EL and sum monopulse signals, are coupled to panel 50 via RF connectors 72. DC and logic signals are coupled to panel 50 via connector 74. With this approach, by simply disconnecting each RF connector 72 and each DC/logic connector 74 on panel 50, panel 50 may be removed from an array of panels which form a multi-faced phased array antenna (e.g. such as phased array antenna 18 described above in conjunction with FIG. 1) without making or breaking RF or DC/logic connections to any other panel. This approach allows panels to be repaired or exchanged while the radar is still operational.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A mobile radar system comprising:
  a vehicle; and
  a phased array radar system disposed on a portion of said vehicle, said phased array radar system movable between a stowed position and a deployed position and wherein said phased array radar system is configured to be operational when in the stowed position and when in the deployed position and while said vehicle is moving wherein said phased array radar system comprises an active, electronically-steerable, phased array (AESA) antenna and wherein said AESA antenna is provided having four faces arranged to provide substantially continuous 360° scan coverage when said AESA antenna is in the deployed position; and
  said AESA antenna is provided having four faces arranged to provide substantially continuous 270° scan coverage when said phased array radar system is in the stowed position.

2. A mobile radar system comprising:
  a vehicle; and
  a phased array radar system disposed on a portion of said vehicle, said phased array radar system movable between a stowed position and a deployed position and wherein said phased array radar system is configured to be operational when in the stowed position and when in the deployed position and while said vehicle is moving wherein said phased array radar system comprises an active, electronically-steerable, phased array (AESA) antenna and wherein said AESA antenna has four independently controlled faces and wherein when said AESA antenna is in the stowed position three antenna faces are active and when said AESA antenna is in its deployed position four antenna faces are active.

3. The mobile radar system of claim 1 wherein said phased array radar system uses different sub-apertures on different ones of said plurality of faces such that said phased array radar system can transmit a radio frequency (RF) signal using a first sub-aperture on a first one of said plurality of faces and can receive an RF signal using a second sub-aperture on a second different one of said plurality of faces.

4. The mobile radar system of claim 1 wherein said phased array radar system comprises:
  a movable antenna platform having a first end configured to be mounted on said vehicle and having a second end, said antenna platform movable between the stowed position and the deployed position; and
  said AESA antenna is coupled to the second end of said movable antenna platform, wherein said AESA antenna is operable while said movable antenna platform is positioned in either the stowed position or the deployed position.

5. The mobile radar system of claim 4 wherein the vehicle is provided as a ground based vehicle.

6. The mobile radar system of claim 5 wherein:
  said AESA antenna is provided as a self-contained, solid state AESA antenna having a plurality of faces;
  while said vehicle is moving, said AESA antenna is operable in at least two different modes of operation with a first mode of operation corresponding to a scan mode of operation and a second mode of operation corresponding to a tracking mode of operation; and
  while said vehicle is at stationary, said AESA antenna is operable in at least two different modes of operation with a first mode of operation corresponding to a scan mode of operation and a second mode of operation corresponding to a tracking mode of operation.

7. The mobile radar system of claim 6 wherein each face of said AESA antenna is provided from a plurality of panel array antenna with each of said plurality of panel array antenna being removably connected to said phased array radar system such that an individual one of said plurality of panel array antennas panel can be removed and replaced without making or breaking power and signal cables to other ones of said plurality of panel array antennas.

8. The mobile radar system of claim 7 wherein said AESA antenna can substantially simultaneously operate sub-apertures on each of said plurality of faces in a transmit mode.

9. The mobile radar system of claim 7 wherein said AESA antenna can simultaneously operate sub-apertures on each of said plurality of faces in a receive mode.

10. The mobile radar system of claim 7 wherein the phased array radar system receives power from a prime power source provided as part of said vehicle.

11. The mobile radar system of claim 7 further comprising a primary power source shared among the plurality of faces of said AESA antenna.

12. The mobile radar system of claim 11 wherein said power source is provided as an independent power source.

13. The mobile radar system of claim 4 wherein said movable antenna platform comprises a scissors-jack structure.

14. The mobile radar system of claim 4 wherein said array antenna is rotatably-mounted to said movable platform and wherein said movable platform raises said AESA antenna to a deployed position such that each face of said AESA antenna is above a top-most surface of said vehicle such that said AESA antenna is able to electronically scan antenna beams substantially unobstructed by any portion of said vehicle.

15. The mobile radar system of claim 4 wherein said movable antenna platform is provided as a telescoping antenna platform.

16. The mobile radar system of claim 4 wherein when said movable antenna platform is in the stowed position, said AESA antenna is operable to provide substantially 270 degrees of scan coverage and when said movable antenna platform is in the deployed position, said AESA antenna is operable to provide substantially 360 degrees of scan coverage.

17. The mobile radar system of claim 2 wherein said phased array radar system uses different sub-apertures on different ones of said plurality of faces such that said phased array radar system can transmit a radio frequency (RF) signal using a first sub-aperture on a first one of said plurality of faces and can receive an RF signal using a second sub-aperture on a second different one of said plurality of faces.

18. The mobile radar system of claim 2 wherein said phased array radar system comprises:
a movable antenna platform having a first end configured to be mounted on said vehicle and having a second end, said antenna platform movable between the stowed position and the deployed position; and
said AESA antenna is coupled to the second end of said movable antenna platform, wherein said AESA antenna is operable while said movable antenna platform is positioned in either the stowed position or the deployed position.

19. The mobile radar system of claim 18 wherein the vehicle is provided as a ground based vehicle.

20. The mobile radar system of claim 19 wherein:
said AESA antenna is provided as a self-contained, solid state AESA antenna having a plurality of faces;
while said vehicle is moving, said AESA antenna is operable in at least two different modes of operation with a first mode of operation corresponding to a scan mode of operation and a second mode of operation corresponding to a tracking mode of operation; and
while said vehicle is at stationary, said AESA antenna is operable in at least two different modes of operation with a first mode of operation corresponding to a scan mode of operation and a second mode of operation corresponding to a tracking mode of operation.

21. The mobile radar system of claim 20 wherein each face of said AESA antenna is provided from a plurality of panel array antenna with each of said plurality of panel array antenna being removably connected to said phased array radar system such that an individual one of said plurality of panel array antennas panel can be removed and replaced without making or breaking power and signal cables to other ones of said plurality of panel array antennas.

22. The mobile radar system of claim 21 wherein said AESA antenna can substantially simultaneously operate sub-apertures on each of said plurality of faces in a transmit mode.

23. The mobile radar system of claim 21 wherein said AESA antenna can simultaneously operate sub-apertures on each of said plurality of faces in a receive mode.

24. The mobile radar system of claim 21 wherein the phased array radar system receives power from a prime power source provided as part of said vehicle.

25. The mobile radar system of claim 21 further comprising a primary power source shared among the plurality of faces of said AESA antenna.

26. The mobile radar system of claim 15 wherein said power source is provided as an independent power source.

27. The mobile radar system of claim 18 wherein said movable antenna platform comprises a scissors jack structure.

28. The mobile radar system of claim 18 wherein said array antenna is rotatably-mounted to said movable platform and wherein said movable platform raises said AESA antenna to a deployed position such that each face of said AESA antenna is above a top-most surface of said vehicle such that said AESA antenna is able to electronically scan antenna beams substantially unobstructed by any portion of said vehicle.

29. The mobile radar system of claim 18 wherein said movable antenna platform is provided as a telescoping antenna platform.

30. The mobile radar system of claim 18 wherein when said movable antenna platform is in the stowed position, said AESA antenna is operable to provide substantially 270 degrees of scan coverage and when said movable antenna platform is in the deployed position, said AESA antenna is operable to provide substantially 360 degrees of scan coverage.

* * * * *